(12) United States Patent
Lee et al.

(10) Patent No.: US 9,168,510 B2
(45) Date of Patent: Oct. 27, 2015

(54) NICKEL CATALYSTS FOR REFORMING HYDROCARBONS

(71) Applicant: Samsung Electronics Co., Ltd., Suwon-Si, Gyeonggi-Do (KR)

(72) Inventors: Seung Jae Lee, Suwon-si (KR); In Hyuk Son, Yongin-si (KR); Hyun Seog Roh, Wonju-si (KR); Won Jun Jang, Wonju-si (KR)

(73) Assignees: SAMSUNG ELECTRONICS CO., LTD., Gyeonggi-Do (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/863,752

(22) Filed: Apr. 16, 2013

(65) Prior Publication Data
US 2014/0041300 A1 Feb. 13, 2014

(30) Foreign Application Priority Data
Aug. 8, 2012 (KR) .................. 10-2012-0086950

(51) Int. Cl.
*C01B 3/26* (2006.01)
*B01J 21/00* (2006.01)
(Continued)

(52) U.S. Cl.
CPC .............. *B01J 23/83* (2013.01); *B01J 23/002* (2013.01); *B01J 23/78* (2013.01); *B01J 35/0053* (2013.01); *B01J 35/0066* (2013.01);
(Continued)

(58) Field of Classification Search
CPC ............ B01J 23/78; B01J 23/83; B01J 21/04; B01J 21/066; B01J 21/08; B01J 21/10; B01J 21/14; B01J 35/0066; B01J 35/006; B01J 35/0053; B01J 37/03; B01J 37/08; B01J 37/16; B01J 2523/00; B01J 2523/22; B01J 2523/847; C01B 3/40
USPC .................. 502/242, 252, 259, 263, 302–304, 502/327–328, 335, 337, 340–341, 349, 355, 502/415, 439; 423/652–654
See application file for complete search history.

(56) References Cited

U.S. PATENT DOCUMENTS 3,917,541 A * 11/1975 Wright et al. .................. 502/225
RE28,655 E * 12/1975 Rostrup-Nielsen ........... 502/328
(Continued)

FOREIGN PATENT DOCUMENTS

EP 1920830 5/2008
JP 2000-000469 1/2000
(Continued)

OTHER PUBLICATIONS

Calvin H. Bartholomew, "Mechanisms of catalyst deactivation", Applied Catalysis A, 212, (2001), pp. 17-60.
(Continued)

*Primary Examiner* — Cam N. Nguyen
(74) *Attorney, Agent, or Firm* — Harness, Dickey & Pierce, P.L.C.

(57) ABSTRACT

A catalyst for reforming hydrocarbons may include a catalytically active amount of nickel or nickel oxide dispersed on a metal oxide support. The metal oxide support may be of a single-metal oxide of a first metal or a complex-metal oxide of the first metal and a second metal. A co-catalyst of magnesium oxide (MgO) may anchor the nickel or nickel oxide onto the metal oxide support.

26 Claims, 6 Drawing Sheets

(51) Int. Cl.
*B01J 21/04* (2006.01)
*B01J 23/00* (2006.01)
*B01J 23/02* (2006.01)
*B01J 23/06* (2006.01)
*B01J 23/08* (2006.01)
*B01J 23/10* (2006.01)
*B01J 23/58* (2006.01)
*B01J 20/00* (2006.01)
*B01J 23/83* (2006.01)
*B01J 23/78* (2006.01)
*B01J 35/00* (2006.01)
*B01J 37/03* (2006.01)
*B01J 37/08* (2006.01)
*B01J 37/16* (2006.01)
*C01B 3/40* (2006.01)

(52) U.S. Cl.
CPC ............... *B01J 35/006* (2013.01); *B01J 37/03* (2013.01); *B01J 37/08* (2013.01); *B01J 37/16* (2013.01); *B01J 2523/00* (2013.01); *C01B 3/40* (2013.01)

(56) References Cited

U.S. PATENT DOCUMENTS

| | | | | |
|---|---|---|---|---|
| 3,926,583 | A * | 12/1975 | Rostrup-Nielsen | 48/127.7 |
| 3,963,602 | A * | 6/1976 | Wright et al. | 208/111.25 |
| 4,215,998 | A * | 8/1980 | Futami | 48/214 A |
| 4,452,915 | A * | 6/1984 | Dabrowski | 502/328 |
| 4,469,815 | A * | 9/1984 | Sambrook et al. | 502/303 |
| 5,318,936 | A * | 6/1994 | Ferm et al. | 502/163 |
| 5,593,932 | A * | 1/1997 | Gillespie et al. | 502/163 |
| 7,196,036 | B2 * | 3/2007 | Kobayashi et al. | 502/335 |
| 7,452,842 | B2 * | 11/2008 | Wakatsuki et al. | 502/326 |
| 7,824,656 | B2 | 11/2010 | Idem et al. | |
| 8,048,821 | B2 * | 11/2011 | Ryu et al. | 502/324 |
| 8,163,669 | B2 * | 4/2012 | Hampden-Smith et al. | 502/439 |
| 8,178,003 | B2 * | 5/2012 | Nagaoka et al. | 252/373 |
| 8,206,576 | B2 * | 6/2012 | Moon et al. | 208/137 |
| 8,304,367 | B2 * | 11/2012 | Takahashi et al. | 502/335 |
| 8,475,684 | B2 * | 7/2013 | Wakatsuki | 252/373 |
| 8,486,368 | B2 * | 7/2013 | Takahashi et al. | 423/654 |
| 8,673,807 | B2 * | 3/2014 | Ryu et al. | 502/306 |
| 2003/0032554 | A1 * | 2/2003 | Park et al. | 502/302 |
| 2003/0165424 | A1 * | 9/2003 | Ramani et al. | 423/651 |
| 2004/0142817 | A1 * | 7/2004 | Park et al. | 502/335 |
| 2007/0021299 | A1 * | 1/2007 | Takehira et al. | 502/337 |
| 2009/0221421 | A1 * | 9/2009 | Sagou et al. | 502/242 |
| 2009/0272943 | A1 | 11/2009 | Chartier et al. | |
| 2009/0314993 | A1 * | 12/2009 | Zhang et al. | 252/373 |
| 2010/0087313 | A1 * | 4/2010 | Kuperman et al. | 502/251 |
| 2010/0167919 | A1 | 7/2010 | Lee et al. | |
| 2010/0207070 | A1 * | 8/2010 | Nagaoka et al. | 252/373 |
| 2010/0213417 | A1 * | 8/2010 | Chen et al. | 252/373 |
| 2011/0182792 | A1 * | 7/2011 | Suzuki et al. | 423/245.3 |
| 2014/0077134 | A1 * | 3/2014 | Hong et al. | 252/373 |

FOREIGN PATENT DOCUMENTS

| | | |
|---|---|---|
| JP | 2002-126529 | 5/2002 |
| JP | 2006-035172 | 2/2006 |
| KR | 10-2004-051953 | 6/2004 |
| KR | 10-2010-078805 | 7/2010 |

OTHER PUBLICATIONS

Ruckenstein, et al., "Carbon dioxide reforming of methane over nickel/alkaline earth metal oxide catalysts", Applied Catalysis A: General 133, (1995), pp. 149-161.

Ruckenstein, et al., "Carbon dioxide reforming of methane to synthesis gas over supported cobalt catalysts", Applied Catalysis A: General 204 (2000), pp. 257-263.

Chen, et al., "Size-Related Lattice Parameter Changes and Surface Defects in Ceria Nanocrystals", J. Phys. Chem. C, vol. 114, No. 30, 2010, pp. 12909-12919.

Knapp, et al., "Methane Dissociation on the Ceria (111) Surface", J. Phys. Chem. C, vol. 112, No. 44, 2008, pp. 17311-17318.

Wang, et al., "Preparation, Characterization, and Catalytic Properties of Clay-Based Nickel Catalysts for Methane Reforming", Journal of Colloid and Interface Science 204, 128-134 (1998).

* cited by examiner

NICKEL CATALYSTS FOR REFORMING HYDROCARBONS

CROSS-REFERENCE TO RELATED APPLICATION

This application claims priority under 35 U.S.C. §119 to Korean Patent Application No. 10-2012-0086950, filed in the Korean Intellectual Property Office on Aug. 8, 2012, the entire contents of which are incorporated herein by reference.

BACKGROUND

1. Field

The present disclosure relates to nickel catalysts for reforming hydrocarbons, methods of manufacturing the same, and hydrocarbon reforming processes using the same.

2. Description of the Related Art

Hydrocarbons (such as natural gas, petroleum gas, or the like) may be reformed in the presence of a reforming material (such as carbon dioxide, water vapor, and oxygen) and a catalyst so as to be converted to hydrogen, carbon monoxide, or the like. Such reactions may be used for various purposes, for example, for hydrogen supply in fuel cells, which are considered to be an alternative energy source to fossil fuels. For example, methane in natural gas may produce a hydrogen gas via a carbon dioxide reforming (CDR) reaction represented by the following Reaction Scheme 1 or a combined steam carbon dioxide reforming (CSCDR) reaction represented by the following Reaction Scheme 2.

$$CH_4 + CO_2 \rightarrow 2H_2 + 2CO \quad \text{[Reaction Scheme 1]}$$

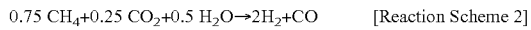

$$0.75\ CH_4 + 0.25\ CO_2 + 0.5\ H_2O \rightarrow 2H_2 + CO \quad \text{[Reaction Scheme 2]}$$

Such reactions are endothermic and require a relatively high temperature for proceeding in a forward direction. In general, the catalyst degradation that occurs during a reaction may be explained by six mechanisms: catalyst poisoning, fouling (i.e., carbon deposition), sintering, vapor formation, inactive phase formation, and crushing/attrition. When the hydrocarbon reforming reaction is performed at a relatively high temperature, such as in Reaction Scheme 1 and Reaction Scheme 2, carbon deposition and sintering are considered to be the main causes of degradation among the above six mechanisms.

Carbon deposition refers to the physical deposition of chemical species, especially carbon from the fluid phase onto the catalytic surface and in the pores. This deposition steadily occurs from the beginning to the end of a reaction, which decreases the reaction sites of the catalyst and interrupts the diffusion of the reaction gas.

On the other hand, sintering is a catalyst degradation mechanism that is induced by heat. When the catalyst is used at a relatively high temperature and undergoes sintering, the catalyst may become aggregated due to the heat so as to grow into relatively large particles. This results in a decrease in the number or the size of the support pores, and a decrease in the interface area of a catalyst/support. Sintering occurs predominantly at the early stage of reaction. Such sintering phenomenon may result in a smaller area of the catalytically active surface and makes it more difficult for the reaction gas to diffuse into the catalytically active site. Moreover, sintering may cause a decreased interface between the catalyst and the support, leading to a lower level of bonding strength therebetween. As a result, the reaction using the catalyst occurs at a lower conversion rate for reaction gases, the internal pressure of a reactor increases, and the durability of the catalyst/support is deteriorated.

SUMMARY

Various example embodiments relate to a nickel catalyst for reforming hydrocarbons that has an improved initial catalytic activity and maintains its relatively high level of the initial catalytic activity by effectively suppressing a sintering phenomenon.

Various example embodiments relate to a method of manufacturing the catalyst via co-precipitation.

Various example embodiments relate to a method of reforming hydrocarbons using the aforementioned catalyst.

A catalyst for reforming hydrocarbons may include a catalytically active amount of nickel or nickel oxide dispersed on a single- or a complex-metal oxide support of a first metal and optionally a second metal; and a co-catalyst of magnesium oxide (MgO) anchoring the nickel or the nickel oxide onto the metal oxide support.

The catalyst for reforming hydrocarbons may be represented by the following Chemical Formula 1.

      [Chemical Formula 1]

In the above Chemical Formula 1, A is an element (first metal) selected from Ce, Si, La, and Al, B is an element (second metal) selected from Zr and Y, each of a, b, and c represents a mole fraction of Ni, Mg, or the elements A+B, respectively, a:b ranges from about 1:0.5 to about 1:2.3, a:c ranges from about 1:10 to about 1:1, x denotes a mole fraction between a first metal A and a second metal B, 0<x≤1, and d represents a number necessary for the elements to keep a charge balance with oxygen.

In the catalyst for reforming hydrocarbons, Ni may be present in the amount of about 5 wt % to about 20 wt % based on the total weight of the catalyst.

In the catalyst for reforming hydrocarbons, the first metal (A) and the second metal (B) may be Ce and Zr, respectively, and the mole ratio between the metals may be about 0.95:0.05 to about 0.5:0.5, and specifically about 0.9:0.1 to about 0.6:0.4. In other words, x may range from about 0.5 to about 0.95.

When the catalyst for reforming hydrocarbons is contacted with the input gas stream of $CH_4:CO_2:N_2=1:1:1$ at the gas hourly space velocity (GHSV) of about 120,000 h$^{-1}$ at about 800° C. for about 72 hours, the change in the average Ni particle size before and after the reaction is less than about 35%, specifically less than about 33%, and more specifically less than about 30%, as measured from a Ni (111) peak in an X-ray diffraction analysis spectrum.

When the catalyst for reforming hydrocarbons is contacted with the input gas stream of $CH_4:CO_2:N_2=1:1:1$ at GHSV of 120,000 h$^{-1}$ at 800° C. for 24 hours, a decrease in dispersion degree of nickel may be less than about 5%, specifically less than about 3%, and more specifically less than about 2%, as calculated from the $H_2$ chemisorption test results under the hypothesis that Ni and H are chemically adsorbed at a ratio of 1:1.

A method of manufacturing a catalyst for reforming hydrocarbons (that includes a catalytically active amount of nickel or nickel oxide dispersed on a single- or a complex-metal oxide of a first metal and, optionally, a second metal, and a co-catalyst of magnesium oxide (MgO) anchoring the nickel or the nickel oxide onto the metal oxide support) may include the steps of:

a) dissolving a water-soluble salt of a first metal, a water-soluble salt of nickel, a water-soluble salt of magnesium, and, optionally, a water-soluble salt of a second metal in water to provide an aqueous solution;

b) heating the aqueous solution;

c) adding a precipitating agent to the heated aqueous solution and aging the same to form a precipitate;

d) filtering the precipitate and optionally washing the same with water at least once;

e) drying the filtered precipitate; and f) calcinating the dried precipitate.

A method of reforming hydrocarbons may include a step of bringing an input gas stream including a hydrocarbon and a reforming material into contact with a catalyst for reforming hydrocarbons that includes a catalytically active amount of nickel or nickel oxide dispersed on a single- or a complex-metal oxide support of a first metal and, optionally, a second metal, and a co-catalyst of magnesium oxide (MgO) anchoring the nickel or the nickel oxide onto the metal oxide support.

DETAILED DESCRIPTION

Figure 1:
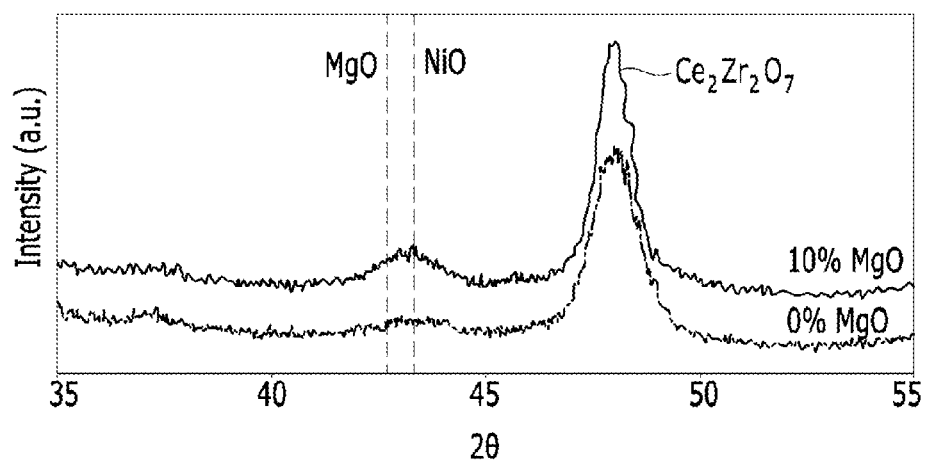
FIG. 1 shows XRD diffraction curves for the catalysts obtained from Example 3 and Comparative Example 1.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The term "catalytically active amount" as used herein means that the amount of material present is sufficient to affect the rate of the reaction being catalyzed by the material.

The term "input gas stream" refers to a gas stream prior to passing through a catalyst region or prior to initial contact with a catalyst composition.

The catalyst for reforming hydrocarbons may include a catalytically active amount of nickel or nickel oxide dispersed on a single- or a complex-metal oxide support of a first metal and, optionally, a second metal, and a co-catalyst of magnesium oxide (MgO), wherein the co-catalyst anchors the nickel or the nickel oxide on the complex metal oxide.

The catalyst for reforming hydrocarbons may be represented by the following Chemical Formula 1.

    [Chemical Formula 1]

$$Ni_a Mg_b [A_x B_{(1-x)}]_c O_d$$

In the above Chemical Formula 1, A is an element (first metal) selected from Ce, Si, La, and Al, B is an element (second metal) selected from Zr and Y, each of a, b, and c represents a mole fraction of Ni, Mg, or the elements A+B, respectively, a:b ranges from about 1:0.5 to about 1:2.3, a:c ranges from about 1:10 to about 1:1, x denotes a mole fraction between a first metal A and a second metal B, $0 < x \leq 1$, and d represents a number necessary for the elements to keep a charge balance with oxygen.

The catalyst for reforming hydrocarbons may be used in any shape. For example, the catalyst for reforming hydrocarbons may be in the form of a tablet, an extrudate, a pellet, a cylinder, a hollow cylinder, a powder, a bead, washcoat composition deposited on a monolith substrate, a relatively high mechanical strength particulate, or a relatively high heat capacity particulate.

The single-metal oxide may be an oxide of one metal selected from Ce, Si, La, and Al.

The complex-metal oxide may be a metal oxide that may act as a support for a catalyst for reforming hydrocarbons, and includes a complex oxide of a first metal selected from Ce, Si, La, and Al and a second metal selected from Zr and Y. The ratio between the first metal and the second metal may be properly adjusted depending on the type of the desired support. For example, the ceria-zirconia complex oxide support may have a ratio of from about 0.95:0.05 to about 0.5:0.5, specifically, from about 0.9:0.1 to about 0.6:0.4.

In the catalyst, a:c (i.e., the ratio between the mole of catalytically active Ni and a total mole of the first metal and the second metal constituting the complex oxide) ranges from about 1:10 to about 1:1, specifically about 1:5 to about 1:1, and more specifically about 1:3 to about 1:1.5.

In the catalyst for reforming hydrocarbons, Ni is a catalytically active metal for the hydrocarbon reforming reaction and is present in a catalytically active amount. For example, Ni may be present in an amount of about 5 wt % to about 20 wt %, specifically about 7 to about 17 wt % based on the total weight of the catalyst, including the support.

In the catalyst for reforming hydrocarbons, MgO acts as a co-catalyst assisting a catalytic function of the catalytically active metal, e.g., nickel. For example, MgO helps to provide a more uniform dispersion of Ni on the support and helps to anchor the Ni metal to the support as well. In the catalyst composition, "a:b" (i.e., the mole ratio between Ni and Mg) ranges from about 1:0.5 to about 1:2.3, specifically about 1:0.7 to about 1:2.1, and more specifically from about 1:0.8 to about 1:1.95. Within the aforementioned range, MgO may play a role of a co-catalyst of Ni (i.e., making an improvement of dispersibility of Ni while anchoring Ni) without lowering the catalytic activity. The addition of MgO as a co-catalyst makes it possible for the catalyst for reforming hydrocarbons to have a higher level of catalytic activity and may also significantly suppress the catalyst degradation caused by sintering, which the catalyst often undergoes when it is exposed to a relatively high temperature reaction such as a hydrocarbon reforming reaction. Specifically, it may prevent the aggregation of a catalyst active metal of Ni.

The catalyst for reforming hydrocarbons may include a nano-sized Ni metal as supported on the complex metal oxide. When MgO is added thereto as a co-catalyst, it may help provide a relatively uniform dispersion of the Ni metal on the support and also anchors the same to the support, thereby increasing the initial activity of the catalyst. In addition, MgO may significantly suppress a sintering phenomenon caused by the Ni aggregation, thus enabling the catalyst to maintain its relatively high level of initial catalytic activity for a prolonged time. While not wishing to be bound by theory, it is believed that the co-catalyst of Mg has an advantageous heat resistance characteristic with a melting point as high as 2852° C. and also a lattice parameter of 4.2112 Å and a bond distance of 2.11 Å, which are similar to the lattice parameter (4.1940 Å) and the bond distance (2.10 Å) of the main catalyst, thereby allowing the formation of a relatively strong thermodynamic bond with Ni (e.g., to form a Ni—MgO solid solution) to effectively anchor Ni on the support.

Accordingly, when the catalyst for reforming hydrocarbons is brought into contact with the input gas stream of $CH_4:CO_2:N_2=1:1:1$ at a gas hourly space velocity (GHSV) of about 120,000 $h^{-1}$ at about 800° C. for about 72 hours, the change in the Ni particle average size before and after the reaction may be less than about 35%, specifically less than about 33%, and more specifically less than about 30%, as measured from the Ni (111) peak in the x-ray diffraction analysis spectrum. In addition, when the catalyst for reforming hydrocarbons is contacted with the input gas stream of $CH_4:CO_2:N_2=1:1:1$ at a GHSV of 120,000 $h^{-1}$ at 800° C. for 24 hours, a decrease in the degree of nickel dispersion may be less than about 5%, specifically less than about 3%, and more specifically less than about 2%, most specifically less than about 1%, as calculated from the $H_2$ chemisorption test results under the hypothesis that Ni and H are chemisorbed at a ratio of 1:1.

Due to the heat resistance of MgO, the catalyst with a co-catalyst of MgO added thereto has a lower level of reduction for the Ni metal when being subjected to a reduction treatment. However, since MgO contributes to improving the dispersibility of Ni, the initial dispersion of Ni is higher than that of the catalyst without the co-catalyst of MgO, and thereby the initial catalytic activity may also be enhanced. In the catalyst for reforming hydrocarbons, Ni may be dispersed on a nano-scale. For example, the Ni may be in the form of a nanoparticle having a size of about 5 to about 20 nm. The catalyst for reforming hydrocarbons may have a specific surface area of about 300 $m^2/g$ or smaller, specifically about 50 to about 200 $m^2/g$, and more specifically about 50 to 150 $m^2/g$ when it is measured by a nitrogen adsorption test according to a BET method.

A method of manufacturing a catalyst for reforming hydrocarbons (that includes a catalytically active amount of nickel or nickel oxide dispersed on a single- or complex-metal oxide support of a first metal and, optionally, a second metal, and a co-catalyst of magnesium oxide (MgO), wherein the co-catalyst anchors the nickel or the nickel oxide on the complex metal oxide) may include the following steps:

a) dissolving a water-soluble salt of a first metal, a water-soluble salt of nickel, a water-soluble salt of magnesium, and, optionally, a water-soluble salt of a second metal in water to provide an aqueous solution;

b) heating the aqueous solution;

c) adding a precipitating agent to the heated aqueous solution and aging the same to form a precipitate;

d) filtering the precipitate and, optionally, washing the same with water at least once;

e) drying the filtered precipitate; and f) calcinating the dried precipitate.

The method may further include a step of g) reducing the calcined catalyst after step f).

The obtained catalyst for reforming hydrocarbons may be represented by the following Chemical Formula 1.

   [Chemical Formula 1]

In the above Chemical Formula 1, A is an element (first metal) selected from Ce, Si, La, and Al, B is an element (second metal) selected from Zr and Y, each of a, b, and c represents a mole fraction of Ni, Mg, or the elements A+B, respectively, a:b ranges from about 1:0.5 to about 1:2.3, a:c ranges from about 1:10 to about 1:1, x denotes a mole fraction between a first metal A and a second metal B, 0<x≤1, and d is a number necessary for the elements to keep a charge balance with oxygen.

In step a), the water-soluble salts of the first and second metals, nickel, or magnesium may be an organic salt or an inorganic salt, and the kinds thereof are not particularly limited. Specific examples of the water-soluble salt include an acetate salt, a nitrate salt, a sulfate salt, an oxalate salt, a halide, a chloride, and a hydrate thereof. In step a), the water-soluble salt is completely dissolved in water to form an aqueous solution.

In step a), the water-soluble salt of nickel may be used in such an amount that in the resulting catalyst, nickel is present in an amount of about 5 wt % to about 20 wt %, specifically, about 7 to about 17 wt %, based on the total weight of the catalyst for reforming hydrocarbons.

In step a), the water-soluble salt of the first metal, the water-soluble salt of the second metal, the water-soluble salt of nickel, and the water-soluble salt of magnesium may be used in such an amount that in the resulting catalyst of Chemical Formula 1, a:b ranges from about 1:0.5 to about 1:2.3, specifically, from about 1:0.7 to about 1:2.1, and more specifically from about 1:0.8 to about 1:1.95, and a:c ranges from about 1:10 to about 1:1, specifically, from about 1:5 to about 1:1, and more specifically, from about 1:3 to about 1:1.5.

In step a), the water-soluble salt of a first metal may be a water-soluble salt of Ce or a hydrate thereof, and the water-soluble salt of a second metal may be a water-soluble salt of Zr or a hydrate thereof. In this case, the water-soluble salts of the first metal (Ce) and second metal (Zr) may be used in such an amount that in the resulting catalyst of Chemical Formula 1, x ranges from about 0.5 to about 0.95, and specifically, from about 0.6 to about 0.9.

In step b), the aqueous solution is heated at a desired or predetermined temperature, for example, above room temperature and as high as about 100° C., specifically, as high as about 90° C., and more specifically, as high as about 80° C.

In step c), a precipitating agent is added to the heated aqueous solution to form a precipitate, which is then aged for a desired or predetermined amount of time. The aging may be conducted while agitating the precipitate. The types of precipitating agents are not particularly limited, and it is possible to use any one that may prepare a catalyst through a co-precipitation process. Examples of the precipitating agent may include carbonate salts, hydrogen carbonates, oxalate salts, and hydroxides of sodium and/or potassium, ammonium carbonate, ammonium bicarbonate, ammonium hydroxide, and ammonia (ammonia water). More specifically, as the precipitating agent, it is possible to use sodium carbonate, potassium carbonate, sodium bicarbonate, potassium bicarbonate, sodium hydroxide, potassium hydroxide, sodium oxalate, potassium oxalate, or the like. The precipitating agent may be used alone or in the mixture of two or more kinds thereof. By adding the precipitating agent, the pH of the aqueous solution increases so that a resulting compound of the first and second metals, nickel, and magnesium is precipitated in the form of a thermally-decomposable hydroxide. The final pH of the mixture may be at least about 6, specifically, in a range from about 8 to about 11, and more specifically, from about 10 to about 11. The precipitate formed by the addition of the precipitating agent may be aged for at least about 30 minutes, specifically, for about 1-100 hours, and more specifically, for about 10-72 hours. The aging may be performed at a temperature of about 50° C. or higher, specifically, at a temperature of about 65 to 90° C., and more specifically, at a temperature of about 70 to about 85° C. The aging may affect the surface area of the catalyst/support.

In step d), the obtained precipitate is filtered. Optionally, the filtered precipitate may be washed with water at least once, and specifically, at least 3 times. In the washing step, the remaining ions are removed.

In step e), the filtered and, optionally, washed precipitate is dried. The drying may be performed at a temperature of greater than or equal to the ambient temperature (e.g., room temperature). The drying may include drying at a temperature of about 30° C. or lower, and drying at a temperature of about 90° C. or higher. The drying time is not particularly limited and may be appropriately adjusted. For example, when a two-step drying is performed, the drying at a temperature of about 30° C. or lower, for example, the drying at room temperature, may be performed for a time of about 30 minutes or longer, specifically, for about 2 hours to about 48 hours, and more specifically, for about 5 hours to about 36 hours; and the drying at a temperature of about 90° C. or higher may be performed for 5 minutes or longer, specifically, for about 30 minutes to 2 hours, and more specifically, for about 50 minutes to about 90 minutes. When the drying is performed in a two-step process, it is possible to prevent bubble formation or non-uniform pore formation.

In step f), the dried precipitate is calcined and subjected to thermal decomposition of the thermally decomposable hydroxides. The calcinating conditions are not particularly limited, but it may be performed, for example, in an atmosphere of air or an inert gas at a temperature at about 400 to about 1000° C., and more specifically, about 500 to about 900° C., for about 60 minutes to about 420 minutes.

The catalyst obtained from step f) may be formed to have a suitable shape if required. For example, the suitable shape may include a tablet, an extrudate, a pellet, a bead, a cylinder, a hollow cylinder, a powder, washcoat composition deposited on monolith substrate, a relatively high mechanical strength particulate, and a relatively high heat capacity particulate.

In addition, in step g), the catalyst may be subjected to an activation treatment prior to the hydrocarbon reforming reaction. The activation treatment is not particularly limited, but may be performed, for example, by treating the catalyst under a reductive gas atmosphere such as a hydrogen gas at a temperature of about 650° C. to about 1100° C., specifically, at about 700° C. to about 1000° C., for about 1 minute to 180 minutes, specifically, for about 30 minutes to about 120 minutes under a pressure of about 0.1 to about 10 MPa. The reductive gas may be diluted with an inert gas such as nitrogen gas, and may include water vapor in a desired or predetermined molar ratio to the hydrogen gas.

A method of reforming hydrocarbons may include a step of bringing an input gas stream including hydrocarbons and a reforming material into contact with a catalyst for reforming hydrocarbons, the catalyst including a catalytically active amount of nickel or nickel oxide dispersed on a single- or a complex-metal oxide support of a first metal and, optionally, a second metal, and a co-catalyst of magnesium oxide (MgO) anchoring the nickel or the nickel oxide onto the complex metal oxide.

The composition, the characteristics, and the manufacturing methods of the catalyst for reforming hydrocarbons may be the same as set forth above.

The sources of hydrocarbons included in the input gas stream are not particularly limited, but may include fossil fuels such as natural gas, petroleum gas, naphtha, heavy oil, crude oils, coal, or the like; and a non-fossil fuel such as mixed biomass including crude ethanol, wood wastes, and agricultural waste residue; municipal solid waste, pulp sludge, and grass straw. For example, the hydrocarbon comprises methane.

The reforming material may include water (e.g., water vapor), carbon dioxide, oxygen, atmospheric air, and a combination thereof.

In the input gas stream, the supplying ratio of hydrocarbon and reforming material may be adjusted, in light of a $H_2/CO$ ratio, a $CH_4$ conversion rate, a $CO_2$ conversion rate, a yield, or the like, but it is not particularly limited. For example, the supplying ratio of the hydrocarbon and the reforming material may range from about 1:1 to about 1:3, based on the mole ratio. The input gas stream may further include a dilute inert gas such as nitrogen or the like besides the hydrocarbons and reforming materials.

The contacting conditions between the input gas stream and the catalyst for reforming hydrocarbons are not particularly limited as long as a gas including hydrogen is produced by the reforming reaction triggered by the contacting. For example, the contacting may be performed at a temperature of about 500 to about 1100° C., and specifically at about 600 to about 1000° C. under a pressure of about 0.5 to about 50 atm, and more specifically about 1 to about 20 atm. In addition, the gas hourly space velocity (GHSV) of the input gas stream is not particularly limited and may be properly determined in light of a $CH_4$ conversion rate and a $CO_2$ conversion rate. For example, the space velocity (GHSV) of the input gas stream may range from about 500 to 400,000 $h^{-1}$, and more specifically from about 1000 to 380,000 $h^{-1}$.

As described above, when the catalyst for reforming hydrocarbons including the nickel metal supported onto the complex oxide and the co-catalyst of MgO is used for the reforming reaction, its initial catalytic activity is enhanced, and the aggregation of the nickel metal (i.e., sintering) is significantly suppressed even when the reaction is performed at a relatively high temperature, and thereby a decrease in the conversion rate of methane or the reforming material, for example, $CO_2$, may be lowered.

Hereinafter, the catalysts and associated methods of the present disclosure are illustrated in more detail with reference to various examples. However, it should be understood that the following are merely example embodiments and should not be construed as limiting.

EXAMPLE

Preparation of a Catalyst

Example 1

Preparation of $Ni_{0.24}Mg_{0.19}(Ce_{0.8}Zr_{0.2})_{0.57}O_d$ 15 g of $Ni(NO_3)_2$-$6H_2O$, 5 g of $Mg(NO_3)_2$-$6H_2O$, 68.8 g of $Ce(NO_3)_2$-$6H_2O$, and 11.2 g of $Zr(NO_3)_2$-$6H_2O$ are put into 500 ml of deionized water and agitated to be completely dissolved therein. The resulting aqueous solution is heated to 80° C. and 15% KOH is added thereto to adjust the pH of a resultant solution to 10.5, and thereby precipitates are formed. The precipitates are agitated at a temperature of 80° C. for 72 hours, and then filtered and washed with 300 ml of deionized water five times to remove remaining ions. The obtained precipitate is dried at room temperature for 24 hours and then dried again at 100° C. for 1 hour. The dried precipitate is calcined in the air at a temperature of 500° C. for 5 hours to provide a catalyst of the titled composition.

Example 2

Preparation of $Ni_{0.22}Mg_{0.28}(Ce_{0.8}Zr_{0.2})_{0.50}O_d$

A catalyst of the titled composition is prepared in the same manner as set forth in Example 1, except for using 15 g of $Ni(NO_3)_2$-$6H_2O$, 8 g of $Mg(NO_3)_2$-$6H_2O$, 66.4 g of $Ce(NO_3)_2$-$6H_2O$, and 10.6 g of $Zr(NO_3)_2$-$6H_2O$.

Example 3

Preparation of $Ni_{0.21}Mg_{0.33}(Ce_{0.8}Zr_{0.2})_{0.46}O_d$

A catalyst of the titled composition is prepared in the same manner as set forth in Example 1, except for using 15 g of $Ni(NO_3)_2$-$6H_2O$, 10 g of $Mg(NO_3)_2$-$6H_2O$, 64.5 g of $Ce(NO_3)_2$-$6H_2O$, and 10.5 g of $Zr(NO_3)_2$-$6H_2O$.

Example 4

Preparation of $Ni_{0.19}Mg_{0.38}(Ce_{0.8}Zr_{0.2})_{0.43}O_d$

A catalyst of the titled composition is prepared in the same manner as set forth in Example 1, except for using 15 g of $Ni(NO_3)_2$-$6H_2O$, 12 g of $Mg(NO_3)_2$-$6H_2O$, 62.8 g of $Ce(NO_3)_2$-$6H_2O$, and 10.2 g of $Zr(NO_3)_2$-$6H_2O$.

Example 5

Preparation of Al Oxide Support Catalyst

A catalyst of the titled composition is prepared in the same manner as set forth in Example 1, except for using 15 g of $Ni(NO_3)_2$-$6H_2O$, 10 g of $Mg(NO_3)_2$-$6H_2O$, and 75 g of $Al(NO_3)_2$-$6H_2O$.

Comparative Example 1

$Ni_{0.28}(Ce_{0.8}Zr_{0.2})_{0.72}O_d$

A catalyst of the titled composition is prepared in the same manner as set forth in Example 1, except for using 15 g of $Ni(NO_3)_2$-$6H_2O$, 73.1 g of $Ce(NO_3)_2$-$6H_2O$, and 11.9 g of $Zr(NO_3)_2$-$6H_2O$.

Comparative Example 2

$Ni_{0.18}Mg_{0.44}(Ce_{0.8}Zr_{0.2})_{0.38}O_d$

A catalyst of the titled composition is prepared in the same manner as set forth in Example 1, except for using 15 g of $Ni(NO_3)_2$-$6H_2O$, 15 g of $Mg(NO_3)_2$-$6H_2O$, 60.2 g of $Ce(NO_3)_2$-$6H_2O$, and 9.8 g of $Zr(NO_3)_2$-$6H_2O$.

Characterization of the Catalysts

Experimental Example 1

Measurement of BET Surface Area of the Catalyst

BET surface areas of the catalysts prepared in Example 3 and Comparative Example 1 are measured with using a nitrogen adsorption technology at −196° C. with BELsorp (BEL, Japan). Prior to the adsorption measurement, the samples are degassed at a temperature of 200° C. for 24 hours. The results of the measurement confirm that the surface area of the catalyst of Example 3 is 82 $m^2/g$, while the surface area of the catalyst of Comparative Example 1 is 97 $m^2/g$ Experimental Example 2

XRD Analysis of Catalyst (1) The crystal structures of the catalysts obtained from Example 3 and Comparative Example 1 are evaluated by the powder X-ray diffraction (XRD) technique using a Philips Xpert Pro X-ray diffractometer with Cu—Kα radioactive ray at 40 KV and 40 mA. The results are shown in FIG. 1. As shown in FIG. 1, in the case of the catalyst according to Example 3 including a co-catalyst of MgO, peaks at MgO (200) and NiO (200) are increased in their intensities and shifted to a higher angle. This implies that in the catalyst of Example 3, Mg and Ni form a strong bond as in a solid solution.

Figure 2:
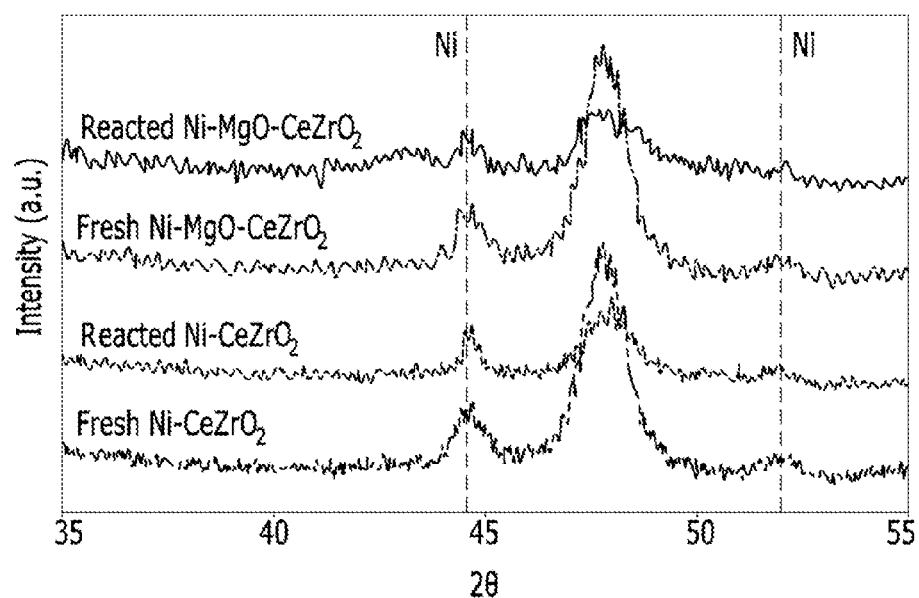
FIG. 2 shows XRD diffraction curves for the catalysts obtained from Example 3 and Comparative Example 1 before and after a reforming reaction.

(2) The Ni particle size of the catalyst of Example 3 including 10 wt % of MgO and the catalyst of Comparative Example 1 are measured with using the Ni (111) peak before and after the $CO_2$ reforming reaction. The XRD graph is shown in FIG. 2 as the results, and the particle size changes are compiled in the following Table 1. The $CO_2$ reforming reaction is performed using the input gas stream of $CH_4:CO_2:N_2=1:1:1$ at a GHSV of 120,000 $h^{-1}$ at 800° C. for 72 hours.

TABLE 1

|  | Ni particle size (nm) | |
| --- | --- | --- |
|  | Before the reforming reaction | After the reforming reaction |
| Catalyst of Comparative Example 1 | 15.67 | 24.68 (58% increase) |
| Catalyst of Example 3 | 15.71 | 19.89 (26% increase) |

The results show that the catalyst of Comparative Example 1 has an increase in the Ni particle size after the reaction by 58%; but the catalyst of Example 3 including a co-catalyst of MgO has an increase in the Ni particle size after by 26%. From the results, it can be found that the particle aggregation of the Ni metal was remarkably suppressed in the catalyst of Example 3.

Experimental Example 3

TPR Analysis of Catalyst

With using Autochem 2910 (Micromeritics Co.) equipment, temperature programmed reduction (TPR) analyses are conducted for the calcined catalysts (Examples 1 and 3 and Comparative Example 1). 0.1 g of a catalyst sample is put into a U-shaped quartz reactor. Then the samples are degassed in an electric furnace at 250° C. for 30 minutes and heated from room temperature to 1000° C. at a linearly programmed rate of 10° C./minute at atmospheric pressure in a reduction gas stream of 10% $H_2/Ar_2$ at a flow rate of 50 ml/minute. The TPR profile is plotted using an on-line data acquisition system. The results are shown in FIG. 3.

Figure 3:
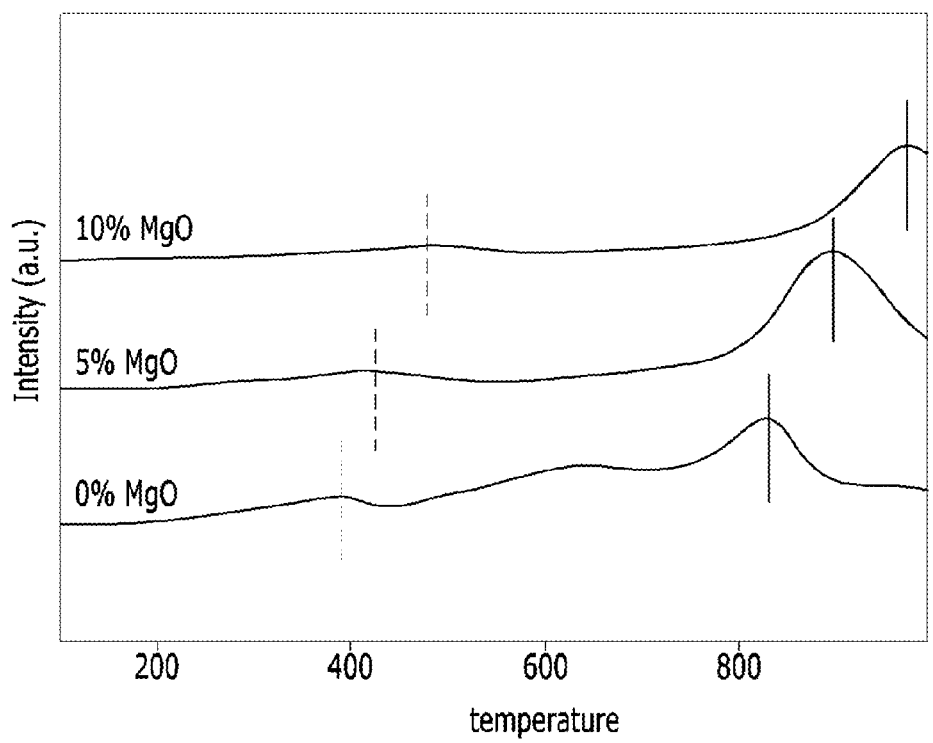
FIG. 3 shows TPR curves for the catalysts obtained from Example 1, Example 3, and Comparative Example 1.

As shown in FIG. 3, the catalyst of Comparative Example 1 with no MgO added shows a free NiO peak around 400° C., on the other hand, the catalysts of Examples 1 and 3 with MgO added show NiO complex peaks at 850 to 1000° C. These peaks are shifted to higher temperatures when increasing the amount of MgO. These results confirm that Ni form a physically strong bond with MgO in the catalyst of the examples.

Experimental Example 4

XPS Measurement

The catalysts of Example 3 and Comparative Example 1 are evaluated with XPS spectrophotometry using Qunatum 2000 (Physical Electronics) equipment. The results are shown in FIG. 4.

Figure 4:
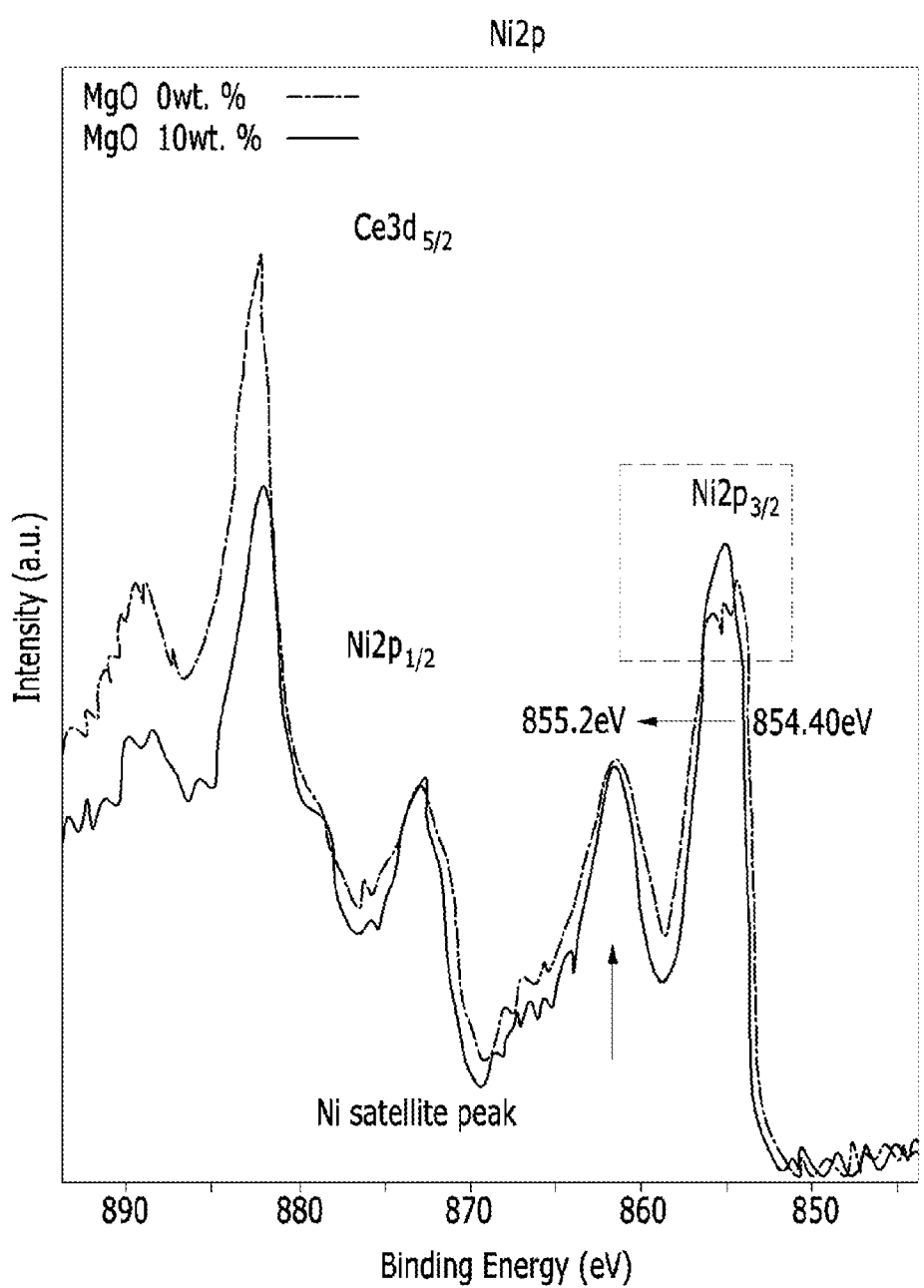
FIG. 4 shows XPS analysis results of the catalysts obtained from Example 3 and Comparative Example 1.

As shown in FIG. 4, the Ni $2p_{3/2}$ peak is shifted by a degree of +0.8 eV in XPS with the addition of MgO. The catalyst of Comparative Example 1 shows 2+ and 3+ mixed NiO peaks, while the catalyst of Example 3 shows NiO peaks with a stronger 3+ peak, and this implies that Ni and MgO form a physically strong bond in the catalyst of Example 3.

Experimental Example 5

Hydrogen Chemisorption Test

The $CO_2$ reforming reactions are conducted using the catalyst obtained from Example 3 and the catalyst obtained from Comparative Example 1. For the catalysts before and after the reaction, a hydrogen chemisorption test is performed. The dispersion degree of nickel is calculated under the hypothesis that Ni and H are chemisorbed at a ratio of 1:1. The reaction is performed under the conditions of GHSV of 120,000 $h^{-1}$ at 800° C. for 24 hours with $CH_4:CO_2:N_2=1:1:1$.

The results are shown in the following Table 2.

TABLE 2

| Catalyst | | Degree of reduction (%) | Ni dispersion (%) | Ni surface area (m²/g) |
| --- | --- | --- | --- | --- |
| Comparative Example 1 | Before reaction | 79.8 | 15.5 | 12.8 |
| | After reaction | | 13.9 | 11.6 |
| Example 3 | Before reaction | 53.3 | 19 | 10.1 |
| | After reaction | | 19 | 10.1 |

As shown in Table 2, the catalyst of Comparative Example 1 with no MgO has a low dispersion degree despite its high level of reduction degree. In addition, it has an even lower dispersion degree after the reaction, implying that the aggregation of Ni particles occurs. On the other hand, the catalyst of Example 3 with MgO as a co-catalyst has a lower reduction degree of NiO due to the relatively high temperature characteristics of MgO but it shows a much higher degree of Ni dispersion than Comparative Example 1. The results also confirm that the catalyst of Example 3 shows almost no decrease in the Ni surface area or the Ni dispersion degree even after the $CO_2$ reforming reaction.

Figure 5:
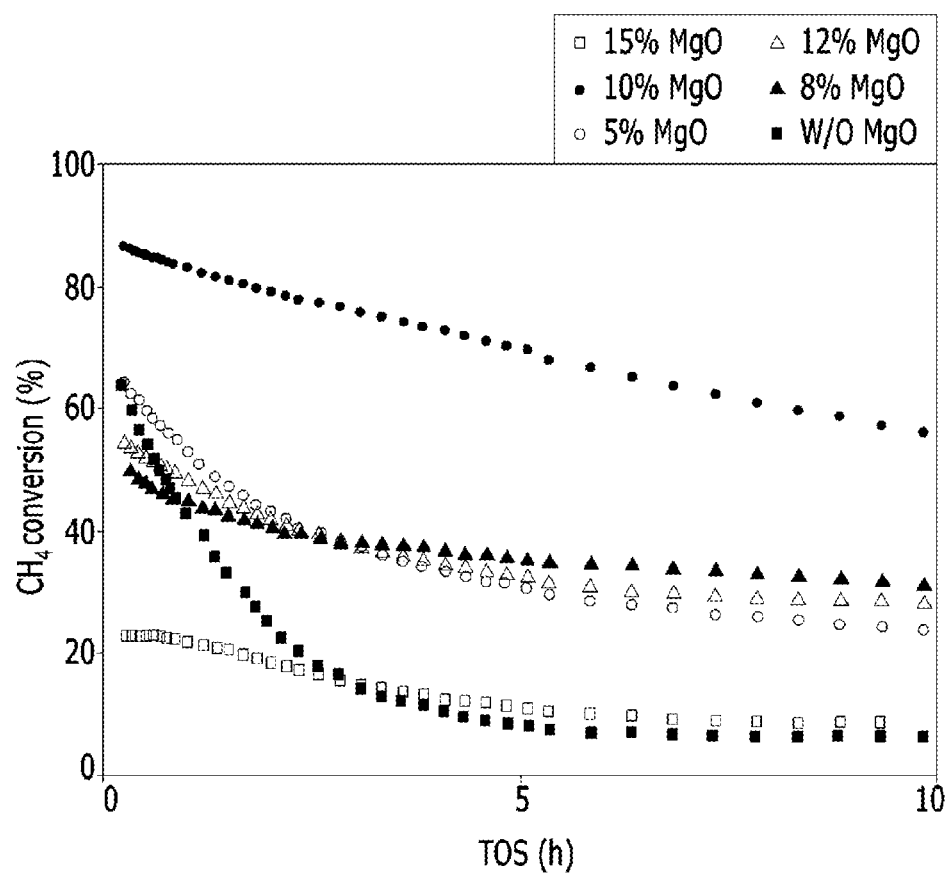
FIG. 5 shows curves plotting a methane conversion rate over time in the carbon dioxide reforming reaction for methane using the catalysts obtained from Examples 1 to 4 and Comparative Examples 1 and 2.
Figure 6:
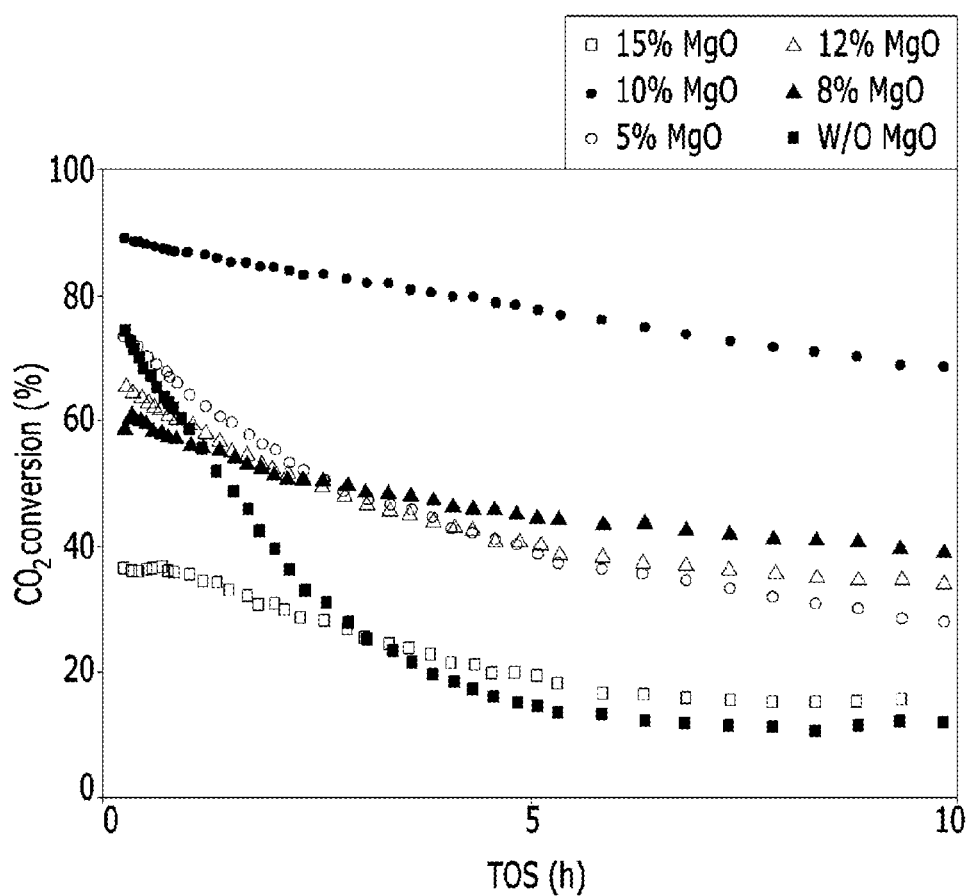
FIG. 6 shows curves plotting a carbon dioxide conversion rate over time in the reaction of reforming methane using the catalysts according to Examples 1 to 4 and Comparative Examples 1 and 2.

Analysis for Catalytic Activity: Conducting Carbon Dioxide Reforming Reaction with Using Catalyst With each catalyst obtained from Examples 1 to 4 and Comparative Examples 1 and 2, the carbon dioxide reforming reaction of methane is conducted, and the $CH_4$ conversion rate and the $CO_2$ conversion rate thereof over time are shown in FIG. 5 and FIG. 6. The conditions for $CO_2$ reforming reaction are as follows:

Temperature=800° C., $CH_4:CO_2:N_2=1.0:1.0:3.0$, GHSV=360,000 $h^{-1}$

As shown in FIG. 5 and FIG. 6, the catalysts of Example 1 to Example 4 have higher initial methane conversion efficiency than Comparative Examples 1 and 2, and the efficiency deterioration of the catalyst is significantly decreased even after the conversion reaction, as well.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A catalyst for reforming hydrocarbons comprising:
   a catalytically active amount of nickel or nickel oxide dispersed on a metal oxide support, the metal oxide support being a single-metal oxide of a first metal or a complex-metal oxide of the first metal and a second metal; and a co-catalyst of magnesium oxide (MgO) anchoring the nickel or the nickel oxide onto the metal oxide support, wherein the catalyst is represented by the following Chemical Formula 1,

  [Chemical Formula 1]

wherein

A is the first metal and selected from Ce, Si, La, and Al,

B is the second metal and selected from Zr and Y, a, b, c, d, and x are real numbers, with a:b ranging from about 1:0.5 to about 1:2.3, a:c ranging from about 1:10 to about 1:1, and 0<x≤1.

2. The catalyst for reforming hydrocarbons of claim 1, wherein the first metal (A) is Ce, the second metal (B) is Zr, and x ranges from about 0.5 to about 0.95.

3. The catalyst for reforming hydrocarbons of claim 1, wherein the Ni is present in an amount of about 5 wt % to about 20 wt % based on a total weight of the catalyst.

4. The catalyst for reforming hydrocarbons of claim 1, wherein a:b ranges from about 1:0.7 to about 1:2.1, and a:c ranges from about 1:5 to about 1:1.

5. The catalyst for reforming hydrocarbons of claim 1, wherein the catalyst is structured such that an increase in an average size of particles of the nickel or the nickel oxide after a hydrocarbon reformation reaction is less than about 35%, as measured from a Ni (111) peak in an X-ray diffraction analysis spectrum, when the catalyst is brought into contact with an input gas stream of $CH_4:CO_2:N_2=1:1:1$ at a GHSV of about 120,000 $h^{-1}$ at about 800° C. for about 72 hours.

6. The catalyst for reforming hydrocarbons of claim 1, wherein the catalyst is structured such that a decrease in dispersion degree of the nickel or the nickel oxide after a hydrocarbon reformation reaction is less than about 5%, as calculated from a hydrogen chemisorption test result under a basis that Ni and H are chemisorbed at a ratio of about 1:1, when the catalyst is brought into contact with an input gas stream of $CH_4:CO_2:N2=1:1:1$ at a GHSV of about 120,000 $h^{-1}$ at about 800° C. for about 24 hours.

7. A method of manufacturing a catalyst for reforming hydrocarbons that includes a catalytically active amount of nickel or nickel oxide dispersed on a metal oxide support, the metal oxide support being a single-metal oxide of a first metal or a complex-metal oxide of the first metal and a second metal, and a co-catalyst of magnesium oxide (MgO) anchoring the nickel or the nickel oxide onto the metal oxide support, the method comprising:

a) dissolving a water-soluble salt of the first metal, a water-soluble salt of the nickel, a water-soluble salt of magnesium, and, optionally, a water-soluble salt of the second metal in water to provide an aqueous solution;

b) heating the aqueous solution to obtain a heated aqueous solution;

c) adding a precipitating agent to the heated aqueous solution and aging to form a precipitate;

d) filtering the precipitate and washing with water at least once to obtain a filtered precipitate;

e) drying the filtered precipitate to obtain a dried precipitate; and f) calcinating the dried precipitate, wherein the catalyst is represented by the following Chemical Formula 1:

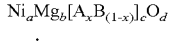  [Chemical Formula 1]

wherein

A is the first metal and selected from Ce, Si, La, and Al,

B is the second metal and selected from Zr and Y, a, b, c, d, and x are real numbers, with a:b ranging from about 1:0.5 to about 1:2.3, a:c ranging from about 1:10 to about 1:1, and 0<x≤1.

8. The method of claim 7, wherein the dissolving in step a) includes the water-soluble salt of the first metal, the water-soluble salt of the nickel, the water-soluble salt of the magnesium, and, optionally, the water-soluble salt of the second metal being selected from the group consisting of an acetate salt, a nitrate salt, a sulfate salt, an oxalate salt, a halide, a chloride, and a hydrate thereof.

9. The method of claim 7, wherein the dissolving in step a) includes adding the water-soluble salt of the nickel in such an amount that results in the nickel being present at about 5 wt % to about 20 wt % based on a total weight of the catalyst for reforming hydrocarbons.

10. The method of claim 7, wherein the dissolving in step a) includes adding the water-soluble salt of the first metal, the water-soluble salt of the nickel, the water-soluble salt of the magnesium, and, optionally, the water soluble salt of the second metal in such an amount that a:b ranges from about 1:0.7 to about 1:2.1 and a:c ranges from about 1:10 to about 1:1.

11. The method of claim 7, wherein the dissolving in step a) includes adding the water-soluble salts of the first metal and the second metal in such an amount that x ranges from about 0.5 to about 0.95, the water-soluble salt of the first metal being a water-soluble salt of Ce or the hydrate thereof, the water-soluble salt of the second metal being a water-soluble salt of Zr or a hydrate thereof.

12. The method of claim 7, wherein the heating in step b) includes maintaining the aqueous solution at a temperature of about 100° C. or lower.

13. The method of claim 7, wherein the adding in step c) includes the precipitating agent being selected from the group consisting of carbonate salts, hydrogen carbonate salts, oxalate salts, sodium hydroxide, potassium hydroxide, ammonium carbonate, ammonium bicarbonate, ammonium hydroxide, ammonia, and a combination thereof.

14. The method of claim 7, wherein the adding in step c) includes adding the precipitating agent such that the heated aqueous solution has a pH of about 6 or higher.

15. The method of claim 7, wherein the aging in step c) includes agitating the heated aqueous solution at a temperature of about 65 to about 90° C. for about 1 to about 10 hours.

16. The method of claim 7, wherein the drying in step e) includes drying at a temperature of about 30° C. or lower and drying at a temperature of about 90° C. or higher.

17. The method of claim 7, wherein the calcinating in step f) is performed in an oxygen, air, or inert gas atmosphere at a temperature of about 400 to about 1000° C.

18. The method of claim 7, further comprising:

reducing the catalyst obtained from the calcinating in step f) at a temperature of about 650° C. to about 1100° C. in a reductive gas atmosphere to activate the catalyst.

19. The method of claim 7, wherein the method produces the catalyst such that an increase in an average size of particles of the nickel or the nickel oxide after a hydrocarbon reformation reaction is less than about 30%, as measured from a Ni (111) peak in an X-ray diffraction analysis spectrum, when the catalyst is brought into contact with an input gas stream of $CH_4:CO_2:N_2=1:1:1$ at a GHSV of about 120,000 $h^{-1}$ at about 800° C. for about 72 hours.

20. The method of claim 7, wherein the method produces the catalyst such that a decrease in dispersion degree of the nickel or the nickel oxide after a hydrocarbon reformation reaction is less than about 5%, as calculated from a hydrogen chemisorption test result under a basis that Ni and H are chemisorbed at a ratio of about 1:1, when the catalyst is brought into contact with an input gas stream of $CH_4:CO_2:N_2=1:1:1$ at a GHSV of about 120,000 $h^{-1}$ at about 800° C. for about 24 hours.

21. A method of reforming hydrocarbons, comprising:
contacting an input gas stream with a catalyst for reforming hydrocarbons, the input gas stream including a hydrocarbon and a reforming material, the catalyst including a catalytically active amount of nickel or nickel oxide dispersed on a metal oxide support, the metal oxide support being a single-metal oxide of a first metal or a complex-metal oxide of the first metal and a second metal, and a co-catalyst of magnesium oxide (MgO) anchoring the nickel or the nickel oxide onto the metal oxide support,
wherein the catalyst is represented by the following Chemical Formula 1:

$Ni_aMg_b[A_xB_{(1-x)}]_cO_d$      [Chemical Formula 1]

wherein
A is the first metal and selected from Ce, Si, La, and Al,
B is the second metal and selected from Zr and Y,
a, b, c, d, and x are real numbers, with a:b ranging from about 1:0.5 to about 1:2.3, a:c ranging from about 1:10 to about 1:1, and $0<x\le 1$.

22. The method of claim 21, wherein the contacting includes the Ni being present in an amount of about 5 wt % to about 20 wt % based on a total weight of the catalyst.

23. The method of claim 21, wherein the contacting includes the first metal (A) being Ce, the second metal (B) being Zr, and x ranging from about 0.5 to about 0.95.

24. The method of claim 21, wherein the contacting includes a:b ranging from about 1:0.7 to about 1:2.1 and a:c ranging from about 1:5 to about 1:1.

25. The method of claim 21, wherein the contacting includes the reforming material being selected from the group consisting of water, carbon dioxide, oxygen, atmospheric air, and a combination thereof.

26. The method of claim 21, wherein the contacting is performed at a reaction temperature of about 500 to about 1000° C. under a pressure of about 0.5 to about 50 atm.

* * * * *